US008275355B2

(12) United States Patent
Huang et al.

(10) Patent No.: US 8,275,355 B2
(45) Date of Patent: Sep. 25, 2012

(54) METHOD FOR ROAMING USER TO ESTABLISH SECURITY ASSOCIATION WITH VISITED NETWORK APPLICATION SERVER

(75) Inventors: Yingxin Huang, Guangdong (CN); Wenlin Zhang, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 535 days.

(21) Appl. No.: 10/591,065

(22) PCT Filed: Mar. 24, 2005

(86) PCT No.: PCT/CN2005/000376
§ 371 (c)(1),
(2), (4) Date: Nov. 15, 2006

(87) PCT Pub. No.: WO2005/096644
PCT Pub. Date: Oct. 13, 2005

(65) Prior Publication Data
US 2008/0160959 A1    Jul. 3, 2008

(30) Foreign Application Priority Data
Apr. 2, 2004  (CN) .......................... 2004 1 0030517

(51) Int. Cl.
*H04M 1/66* (2006.01)
(52) U.S. Cl. ................. 455/410; 455/411; 455/432.1; 455/432.3; 455/435.1; 455/433; 713/155; 713/168; 713/169; 380/247; 380/248
(58) Field of Classification Search .......... 713/153, 713/155, 171; 455/411, 432.1, 432.3, 435.1; 380/247
See application file for complete search history.

(56) References Cited

U.S. PATENT DOCUMENTS

| 6,526,033 | B1 | 2/2003 | Wang et al. |
| 6,879,690 | B2 * | 4/2005 | Faccin et al. ................... 380/247 |
| 7,213,144 | B2 * | 5/2007 | Faccin et al. ................... 713/153 |
| 7,231,521 | B2 * | 6/2007 | Buddhikot et al. ........... 713/171 |
| 2003/0033518 | A1 * | 2/2003 | Faccin et al. ................... 713/153 |

(Continued)

FOREIGN PATENT DOCUMENTS

KR    20010017852    3/2001

(Continued)

OTHER PUBLICATIONS

Office Action from European Patent Office. Dated Jul. 2, 2007.

(Continued)

*Primary Examiner* — Anthony Addy
*Assistant Examiner* — Khalid Shaheed
(74) *Attorney, Agent, or Firm* — Slater & Matsil, L.L.P.

(57) ABSTRACT

The present invention provides a method for a roaming user to establish security association with the application server in the visited network. When receiving the service request from the roaming user, the application server in the visited network establishes security association with the roaming user by making use of the authentication results of the generic authentication architecture in the home network via the BSF in the local network, or the generic authentication architecture proxy in the local network, or the AAA server in the local network and the AAA server in the roaming user's home network, so as to achieve the object that the roaming user is able to use the services of the visited network after authentication of the generic authentication architecture in his home network.

9 Claims, 3 Drawing Sheets

U.S. PATENT DOCUMENTS

2004/0205212 A1* 10/2004 Huotari et al. .............. 709/230
2005/0102501 A1* 5/2005 Haukka et al. .............. 713/155

FOREIGN PATENT DOCUMENTS

| KR | 20020086993 | 11/2002 |
|---|---|---|
| KR | 20030025751 | 3/2003 |
| WO | WO02/063528 | 8/2002 |
| WO | WO 03/014935 | 2/2003 |
| WO | WO 03/055237 | 7/2003 |
| WO | WO03055237 | 7/2003 |

OTHER PUBLICATIONS

3GPP: "3GPP TS 33.220 v6.0.0 (Mar. 2004) 3$^{rd}$ Generation Partnership Project: Technical Specification Group Services and System Aspects; Generic Authentication Architecture (GAA); Generic bootstrapping architecture (Release 6)" 3GPP, [Online] Mar. 22, 2004, pp. 1-18, XP002422872. Retrieved from Internet: http://www.3gpp.org/ftp/Specs/html-info/33220.htm retrieved on Mar. 1, 2007.

3GPP: "3GPP TS 33.221 v6.0.0 (Mar. 2004) 3$^{rd}$ Generation Partnership Project; Technical Specification Group Services and System Aspects; Generic Authentication Architecture (GAA); Support for subscriber certificates (Release 6)" 3GPP, [Online] Mar. 22, 2004, pp. 1-26, XP002422874. Retrieved from the Internet: http://www.3gpp.org/ftp/Specs/html-info/33221.htm. Retrieved on Mar. 1, 2007. p. 8, lines 11-14, p. 9, lines 9-17, p. 10, lines 3-15.

Siemens: "S3-020636 Bootstrapping for subscriber certificates" 3GPP TSG SA WG3 Security S3#26, [Online] Nov. 22, 2002, pp. 1-4, XP002422873. Retrieved from Internet: http://www.3gpp.org/ftp/tsg_sa/WG3_Security/TSGS3_26_Oxford/Docs/PDF/S3-020636.pdf [retrieved on Mar. 1, 2007] abstract, p. 2, line 36-p. 3 line 15.

3GPP: "3GPP TS 33.246 v1.1.0 (Mar. 2004) 3$^{rd}$ Generation Partnership Project; Technical Specification Group Services and System Aspects; Security; Security of Multimedia Broadcast/Multicast Service (Release 6)" 3GPP, [Online] Mar. 4, 2004, pp. 1-18, XP002422971. Retrieved from the Internet: http://www.3gpp.org/ftp/Specs/html-info/33246.htm. [retrieved on Mar. 1, 2007] pp. 5, 10, 14.

Written Opinion of the International Searching Authority, International Application No. PCT/CN2005/000376, Applicant: Huawei Technologies Co., Ltd.,et al. Dated: Jul. 7, 2005, 3 pages.

European Office Action, European Application No. 05 738 199.8-1525, Applicant: Huawei Technologies Co., Ltd., Dated: Mar. 20, 2008, 4 pages.

European Office Action, European Application No. 05 738 199.8-1525, Applicant: Huawei Technologies Co., Ltd., Dated: Sep. 17, 2008, 4 pages.

European Office Action, Summons to attend oral proceedings pursuant to Rule 115(1) EPC, European Application No. 05738199.8-1525/1713289, Applicant: Huawei Technologies Co., Ltd., Dated: Aug. 4, 2009, 5 pages.

3rd Generation Partnership Project, Technical Specification Group Services and System Aspects; Generic Authentication Architecture (GAA); Generic Bootstrapping Architecture (GBA), (Release 10), 3GPP TS 33.220 V10.0.0, Oct. 2010, 75 pages.

* cited by examiner

METHOD FOR ROAMING USER TO ESTABLISH SECURITY ASSOCIATION WITH VISITED NETWORK APPLICATION SERVER

FIELD OF TECHNOLOGY

The present invention generally relates to the 3G radio communication techniques, more particularly to a method for a roaming user to establish security association with an visited network application server.

BACKGROUND OF INVENTION

In the 3G radio communication standards, the generic authentication architecture is a general architecture used by many application services to accomplish authentication of user. The generic authentication architecture can be used to verify user in the application service. The above application services can be multicast/broadcast service, user certificate service, instant information service, or proxy service.

FIG. 1 is the schematic diagram illustrating the construction of the generic authentication architecture. The generic authentication architecture generally includes an User Equipment (UE) 101, a BSF (Bootstrapping Server Function) 102 that performs initial check and verification of the user, a Home Subscriber Server (HSS) 103 and a Network Application Function (NAF) 104. The BSF 102 serves for mutual authentication with the UE 101, and generates a shared key shared by the BSF 102 and the UE 101. The HSS 103 stores an user Profile in it. The Profile includes all descriptive information associated with the user including an user identity. The HSS 103 also functions to generate authentication vector information simultaneously.

When a user needs a certain service, he will go to the BSF 102 directly for mutual authentication if he knows the service demands mutual authentication process at the BSF 102, otherwise, the user will first contact the NAF 104 associated with the service. If the NAF 104 uses the generic authentication architecture, and finds that the user sending the request has not gone to the BSF 102 for mutual authentication, it notifies the user to go to the BSF 102 for mutual authentication.

The mutual authentication process between the user and the BSF 102 is: after the BSF 102 receives the authentication request from the user, it goes to the HSS 103 to get the user's authentication information, according to which the BSF 102 performs the mutual authentication with the user by an Authentication and Key Agreement (AKA). After successful authentication, the user and the BSF 102 authenticate with each other and generate a shared key Ks between them. Thereafter, the BSF 102 assigns to the user a Bootstrapping-Transaction Identifier (B-TID) which is associated with Ks.

After receiving the B-TID, the user sends an access request with the B-TID in it again to the NAF 104. After receiving the request, the NAF 104 verifies that the user is legal and has obtained the Ks or Ks-derived key. The user uses the B-TID to carry out normal communication with NAF under the protection of the Ks or Ks-derived key.

Multicast/Broadcast Multimedia Services (MBMS) are taken as examples in the following text for a specific presentation of the generic authentication architecture's applications. In radio communication field, the multicast service is a point-to-multipoint unidirectional bearer service. Data are transferred from a source to multiple destinations. The users can receive the multicast service by subscribing the multicast service in a certain region. It should be prevented in multicast services that the users who have not subscribed or paid for a multicast service use the service. Therefore, in multicast service groups, a Multicast Service Key (MSK) is provided for a specific service. The MSK is only known by the users of the group and the server that provides the multicast service. The users outside of the group are not authorized to know the key. The shared MSK do not encrypt the MBMS data directly, instead, it functions to perform access control, generates a Multicast Traffic Key (MTK) and encrypts the MTK. The multicast application server uses the MTK to encrypt the service data information. The users in the group use the same shared MTK to decrypt their received service data information to obtain the contents of the service data information. The users outside of the group cannot get the multicast information contents without the shared key.

When using the MBMS, the user needs to pass the authentication of the generic authentication architecture first, i.e., the authentication by the BSF in the generic authentication architecture instead of MBMS server. The Multicast/Broadcast Server (BM-SC) in the MBMS is equivalent to the NAF in the generic authentication architecture. After its authentication, the BSF has shared the Ks with the user, and assigns a B-TID to the users, then the user can use this B-TID for sending service request. The BM-SC queries the BSF after it receives the request with the user's B-TID in it. The BSF returns the Ks or the Ks-derived key after it finds the user information, thus the BM-SC and the user have the shared key Ks or Ks-derived key, which is the Multicast User Key (MUK) in the MBMS that used to protect the point-to-multipoint group shared key the MSK between the BM-SC and the users. That is to say, at the moment, the user and the BM-SC have established a security association between them, i.e., the user believes that the server he has connected to is a real and legal server instead of a counterfeit server with other equipment; and simultaneously, the server also believes that the service-request user is a legal user instead of an attacker. The basis for the security association is that they have the same shared key. In the subsequence communication, they use the MUK to identify their respective counterparty.

The applying mode based on the generic authentication architecture is only used in the user's home network. That is to say, the existing techniques only take into account the cases of using the generic authentication architecture in the user's home network, instead of the issue how to use the generic authentication architecture in the user's home network when a roaming user uses services of a visited network.

In practical applications, a roaming user who has passed authentication with the generic authentication architecture generally needs some services of the visited network, for instance, the roaming user might need some information like the local news, weather and traffic. Since the existing techniques have not taken into account the issue how to use the generic authentication architecture of the home network in the visited network, the roaming user is unable to establish security association with the application server in the visited network with the help of the generic authentication architecture, thus the roaming user is unable to use the services of the visited network although he has passed authentication by the generic authentication architecture.

SUMMARY OF THE INVENTION

In view of the above, the object of the present invention is to provide a method for a roaming user to establish security association with an application server in a visited network, so that the roaming user and the application server in the visited network are able to establish security association with the help of a generic authentication architecture in the user's home network.

To attain the above object, the technical solution in accordance with the present invention is achieved as follows:

A method for a roaming user to establish security association with an application server in a visited network, wherein the roaming user has successfully completed mutual authentication with a BSF that performs user identity initial verification in the generic authentication architecture in his home network, and obtained a B-TID assigned by the BSF, including:

receiving the service request message with the B-TID in it from the roaming user, the application server in the visited network obtaining the roaming user's information from the user's authentication results made by the generic authentication architecture in the roaming user's home network, establishing security association with the roaming user.

preferably, the steps of obtaining the roaming user's information includes:

the application server in the visited network sending a query message to an authentication entity in the local network to inquire about the user information associated with the B-TID;

when receiving the query message, the authentication entity finding out the user's home network according to the B-TID in the message, and acquiring the user information associated with the B-TID from the BSF in the user's home network, and returning the acquired message to the application server;

the application server in the visited network obtaining the user information according to the message returned by the authentication entity.

Preferably, the authentication entity in the visited network is the BSF or a generic authentication architecture proxy in the visited network;

the step of the BSF or the generic authentication architecture proxy in the visited network acquiring the user information associated with the B-TID from the roaming user's home network includes:

the BSF or the generic authentication architecture proxy in the visited network directly sending a query message to the BSF in the roaming user's home network, inquiring the user information associated with the B-TID; and obtaining the user information associated with the B-TID from the response message returned by the BSF in the roaming user's home network.

Preferably, the generic authentication architecture proxy in the visited network is an independent server, or a server combined with an AAA server in the local network or a server combined with the application server in the local network.

Preferably, the authentication entity in the visited network is the AAA server in the visited network;

the step of the AAA server in the visited network acquiring the user information associated with the B-TID from the BSF in the roaming user's home network includes:

the AAA server in the visited network sending a query message to the AAA server in the roaming user's home network, inquiring the information associated the B-TID;

the AAA server in the home network inquiring the BSF in the local network, after the BSF in the local network finding the user information associated with the B-TID, it returning a response message, with the user information associated with the B-TID in it, to the local AAA server, and the AAA server returning a response message, with the user information associated with the B-TID in it, to the AAA server in the visited network; the AAA server in the visited network obtaining the user information associated with the B-TID from the response message returned by the AAA server in the roaming user's home network.

Preferably, if the visited network neither supports the generic authentication architecture, nor the generic authentication architecture proxy, and the visited network do not identify the B-TID, then the steps of obtaining the roaming user's information includes:

the application server in the visited network notifying the roaming user that TI is an illegal identity, and indicating the user to use his permanent identity;

having received the service request message with the permanent identity in it from the roaming user again, the application server in the visited network sending an authentication request to the AAA server in the local network; the AAA server in the visited network finding out the user's home network according to the user's permanent identity, and sending another authentication request to the AAA server in the roaming user's home network;

having received the authentication request from the AAA server in the visited network, the AAA server in the home network sending a request to the BSF in the local network for authentication of the user;

the BSF in the home network carrying out mutual authentication with the user via the AAA server in the local network, the AAA server in the visited network and the application server in the visited network, after successful authentication, the BSF in the home network directly returning a successful authentication message to the AAA server in the local network, and the AAA server in the local network returning the successful authentication message to the AAA server in the visited network; and the authorization massage carrying the user information;

the application server in the visited network obtaining the roaming user's information from the successful authentication message returned by the AAA server in the local network.

Preferably, the user information comprises at least: key information and user identity.

Preferably, the user information also comprises Profile information associated with security.

Preferably, the key information is the shared key Ks generated in authentication, or the Ks-derived key and its valid term.

In the present invention, after the application server in the visited network receives the service request message from the roaming user with the B-TID information carried in the message, the application server in the visited network establishes security association with the roaming user according to the authentication results of the generic authentication architecture in the roaming user's home network, so as to achieve the object that the roaming user uses the services of the visited network via the generic authentication architecture of the user's home network. In the present invention, the roaming user still uses his home network's authentication results when he uses the visited network services, therefore, the existing network architecture is put into effective use so as to save resources. The present invention provides the user with a new approach for accessing the visited network services, so that the visited network is able to provide services to the user to the maximum extent. Additionally, even if the application server in the visited network can not recognize the B-TID at all, the roaming user can use the generic authentication architecture of his home network to complete authentication process as well, so as to diminish the cases of authentication failure aroused by Sequence Number (SQN) being out of synchronization in AAA server's authentication.

DETAILED DESCRIPTION OF THE EMBODIMENTS

Figure 1:
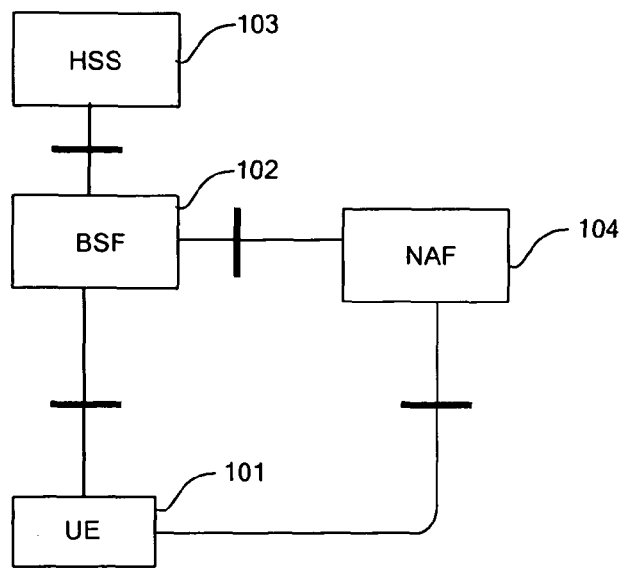
FIG. 1 is a schematic diagram illustrating the construction of the generic authentication architecture.

The present invention is explained in detail with the help of the drawings and specific embodiment examples so as to provide an explicit presentation of the present invention's technical solution.

The idea of the present invention is: after receiving service request from an roaming user, an application server in a visited network establishes a security association with the roaming user via the BSF in the local network, or the generic authentication architecture proxy in the local network, or the AAA server in the local network, and the AAA server in the roaming user's home network, and by the use of the authentication results of the generic authentication architecture in the home network, so as to achieve the object that the roaming user is able to use the services of the visited network via authentication by the generic authentication architecture in his home network.

In order to give a better explanation how the roaming user establishes security association with the application server in the visited network via the generic authentication architecture of his home network, the following possible cases are presented.

On the part of a roaming user, he might need to use the services of his home network, and also might need to use the services of the visited network.

When the roaming user uses the services of his home network, because of IP connection of the networks, the roaming user can communicate with the application server of his home network via the application layer, and uses the generic authentication architecture of his home network directly. This is completely identical to the existing operation methods.

The following is the specific cases that the roaming user uses the services of the visited network.

In regard to the visited network to which the roaming user gets accessed, there might exist four cases:

1) The visited network supports the generic authentication architecture;

2) The visited network does not support the generic authentication architecture, but supports the generic authentication architecture proxy; in this case, there might be an independent server that supports the generic authentication architecture proxy, but in practical applications, the server is usually combined with other entities. For instance, the server that supports the generic authentication architecture proxy is combined with AAA server, and AAA functions to support the generic authentication architecture proxy, i.e., AAA achieves B-TID analysis and routing functions. In the visited network, there might not be an independent server that supports the generic authentication architecture proxy, instead, each server in the visited network supports the generic authentication architecture proxy function, i.e., each actual application server functions to achieve B-TID analysis and routing functions. Since cases 1) and 2) are similar in the processing methods, they are explained with one embodiment example.

3) The visited network neither supports the generic authentication architecture, nor the generic authentication architecture proxy, and the application server in the visited network neither verifies nor processes the B-TID, instead, it just takes the B-TID as a user identity and directly transfers the B-TID to the AAA server in the local network, and requests the AAA server to carry out authentication.

4) The visited network neither supports the generic authentication architecture, nor the generic authentication architecture proxy, and the application server in the visited network verifies the B-TID it receives, but because there is no concept of the generic authentication architecture in the visited network, the application server can not recognize the B-TID, therefore, it requests that the user should use his permanent identity, such as IMSI.

It is taken as an example in the following that the roaming user uses MBMS of the visited network to explain the method of establishing security association, of which, the BM-SC is the application server of MBMS.

Figure 2:
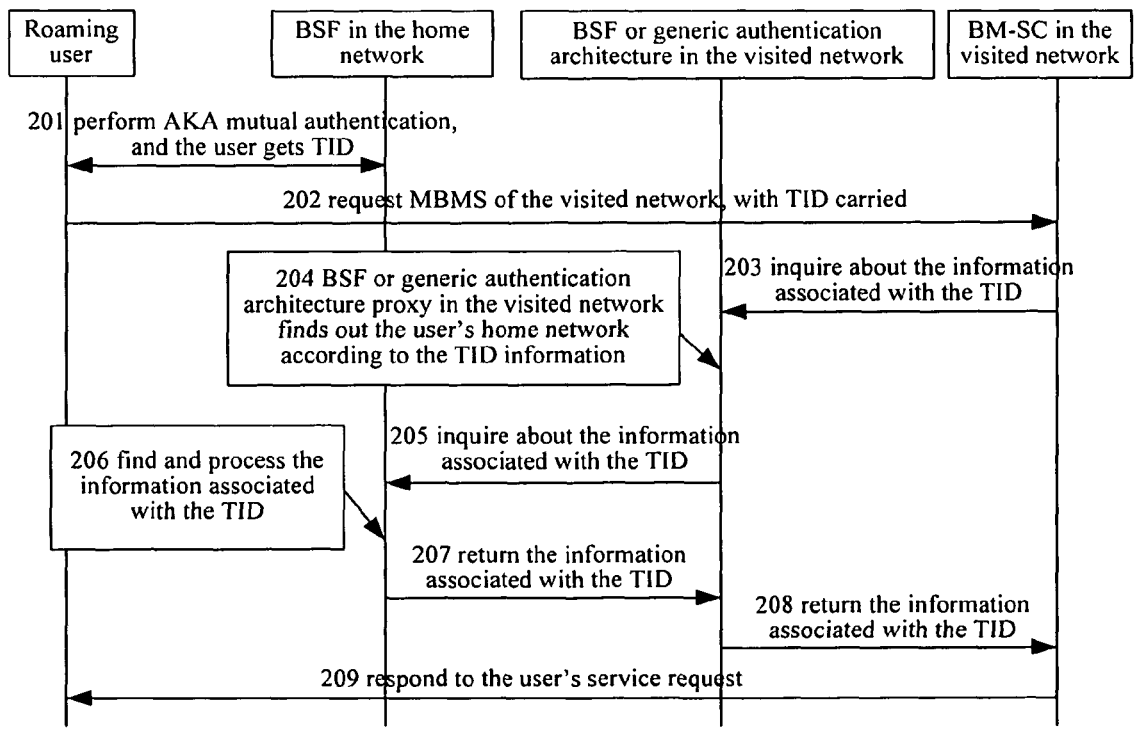
FIG. 2 is a flowchart of a first embodiment of the present invention.

FIG. 2 is the flowchart of the first embodiment of the present invention. The application server establishes security association with the roaming user by directly inquiring about the authentication results of the generic authentication architecture of the roaming user's home network, steps are as follows:

Step 201: the roaming user carries out AKA mutual authentication with the BSF in the generic authentication architecture of his home network. After having passed the authentication, he gets the B-TID assigned by the BSF and has the shared Ks with the BSF in his home network;

Step 202: The roaming user sends service request message to the BM-SC in the visited network, with the B-TID carried in the message;

Step 203: If the visited network supports the generic authentication architecture, the BM-SC inquires about the user information associated with the B-TID to the BSF in the local network;

If the visited network only supports the generic authentication architecture proxy functions, which are achieved by an independent server, the BM-SC inquires about the user information associated with the B-TID to the server that achieves the generic authentication architecture proxy in the local network;

If the visited network only supports the generic authentication architecture proxy, and each application server supports the generic authentication architecture function, then the BM-SC inquires about the user information associated with the B-TID as well, but the query is achieved through the internal interface in the application server;

Step 204: The BSF or the generic authentication architecture proxy in the visited network finds out the roaming user's home network according to the received B-TID;

Step 205: The BSF or the generic authentication architecture proxy in the visited network inquires about the user information associated with the B-TID from the BSF in the roaming user's home network;

Step 206: Having searched the user information associated with the B-TID, the BSF in the home network carries out processing according to the local operator's policy, i.e., it determines to return the Ks associated with the B-TID, or return Ks' derived key and the valid term of the derived key, as the key information in the user information. If it chooses the latter, the BSF carries out the operation of key derivation and setting the valid term of the derived key;

Step 207: The BSF in the home network returns a response message carrying the user information associated with the B-TID to the BSF or the generic authentication architecture proxy in the visited network. The above said user information associated with the B-TID includes key information, user identity and the profile information associated with security, of which the key information and the user identity are mandatory. The key information is used to ensure normal communication between the user and the BM-SC, and the user identity is used for charging. If the visited network can not make sure the real identity of the user, problems will occur when it settles account with the home network. The profile information associated with security is optional;

Step 208: The BSF or the generic authentication architecture proxy in the visited network returns the information associated with the B-TID to the BM-SC. Having received the user information associated with the B-TID, the BM-SC shares KS or its derived key with the user. Serving as the MUK of MBMS, the key functions to protect the point-to-point encrypted transmission of the MSK;

At the moment, the BM-SC has established security association with the roaming user, and believes that the roaming user initiating the request is legal. This is because, if the BM-SC is able to find the user information associated with the B-TID, it means that the user has passed the authentication, and the user is legal, thus BM-SC has the shared key with the roaming user. In the subsequence communication process, the BM-SC and the user verify if the counterparty is real with the shared key. On the contrary, if the BM-SC is unable to find the user information associated with the B-TID, it means that the user has not yet passed the authentication, and the user is currently illegal.

Step 209: The BM-SC sends a confirmation message to the user, and carry out associated service process with the user including MBMS internal key distribution and service delivery.

Up to now, the roaming user achieves the object of using the services in the visited network via the generic authentication architecture in his home network. The above method is applicable to the case that the visited network which the user gets accessed to supports the generic authentication architecture, or supports the generic authentication architecture proxy.

Figure 3:
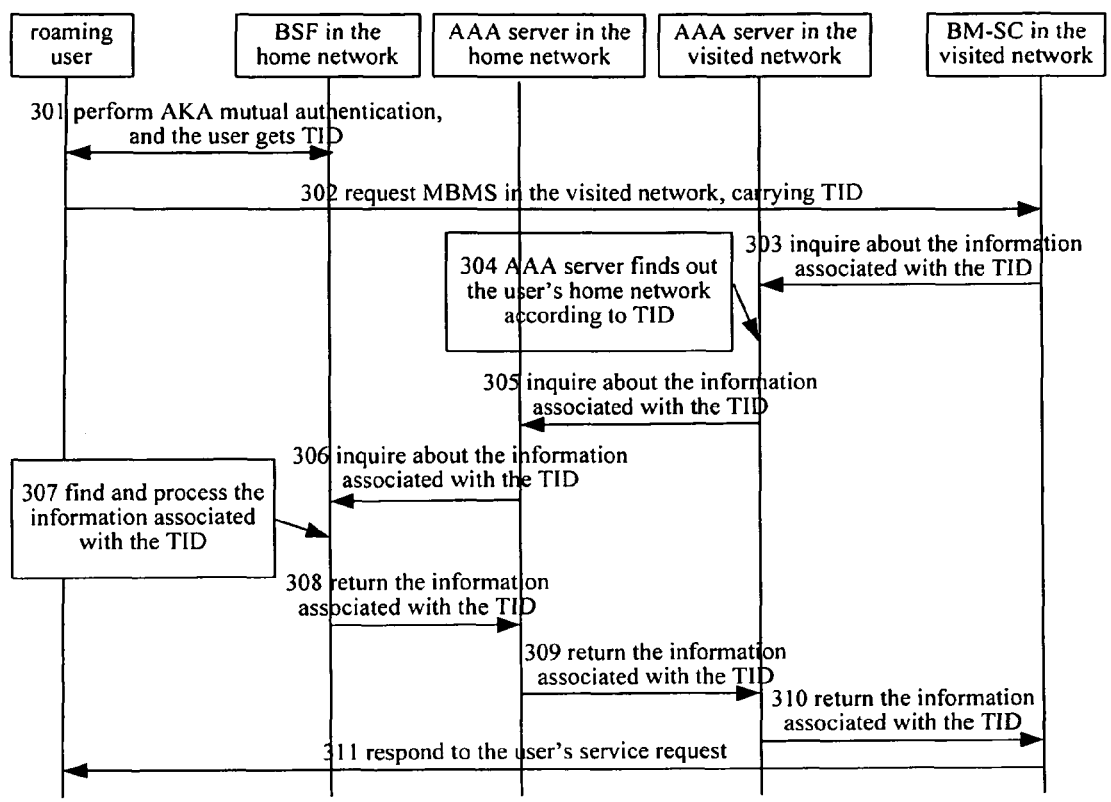
FIG. 3 is a flowchart of a second embodiment of the present invention.

FIG. 3 is the flowchart of the second embodiment of the present invention. The application server establishes security association with the roaming user via directly inquiring about the authentication results of the generic authentication architecture of the roaming user's home network, steps are as follows:

Step 301: The roaming user carries out AKA mutual authentication with the BSF in the generic authentication architecture of his home network. After having passed the authentication, he gets the B-TID assigned by the BSF and has the shared Ks with the BSF in his home network.

Step 302: The roaming user sends service request message to the BM-SC in the visited network, with the B-TID information carried in the message;

Step 303: The BM-SC in the visited network does not check if the user identity is legal, instead, it takes the B-TID as the user identity and directly sends an query request to the AAA server in the local network, that is, it requests the AAA server in the local network to carry out authentication of the user, i.e., to judge if the user is legal;

Step 304: The AAA server in the visited network finds out the user's home network according to the B-TID's format (the format is: user identity @domain name);

Step 305: The AAA server in the visited network sends a B-TID query request to the AAA server in the roaming user's home network, i.e., to request the AAA server in the home network to carry out authentication of the user;

Step 306: Having received the B-TID query request massage, the AAA server in the home network goes to the BSF for the query because it know that the B-TID is assigned by the BSF in the generic authentication architecture of the network; The BSF and the AAA server are similar to each other in executing some functions, therefore, the BSF might be replaced by an AAA server in the local network. In that case, the message between the BSF and the AAA server is an internal interface message;

Step 307: Having found the user information associated with the B-TID, the BSF in the home network carries out processing according to the local operator's policy, i.e., it determines to return the Ks associated with the B-TID or return Ks' derived key and the valid term of the derived key to the request initiator as the key information in the user information. If it chooses the latter, the BSF carries out the operation of key derivation and setting the valid term of the derived key;

Step 308: The BSF in the home network returns a response message of the user information associated with the B-TID to the AAA server in the local network. The above said user information associated with the B-TID includes key information, user identity and the profile information associated with security, of which the key information and the user identity are mandatory. The key information serves to ensure normal communication between the user and the BM-SC, and the user identity is used for charging. If the visited network can not make sure the real identity of the user, problems will occur when the visited network settles account with the home network. The profile information associated with security is optional;

Step 309: The AAA server in the home network returns the message to the AAA server in the visited network, with the user information associated with the B-TID carried in the message; Having received the message from the AAA server in the home network, the AAA server in the visited network believes that the home network has carried out authentication of the user, and the returned message for the query is equivalent to an authorization message;

Step 310: The AAA server in the visited network returns a response message to the BM-SC, with the user information associated with the B-TID carried in the message. The BM-SC obtains the user information associated with the B-TID from the received response message and simultaneously has the shared Ks or Ks-derived key with the user. Serving as the MUK of MBMS, the key functions to protect the point-to-point encrypted transmission of the MSK; i.e., if only the BM-SC obtains the roaming user's user information, it establishes security association with the roaming user, and believes that the roaming user initiating the request is legal.

Step 311: The BM-SC sends a confirmation message to the user, and carry out associated service process with the user including MBMS internal key distribution and service delivery.

Up to now, the roaming user achieves the object of using the services in the visited network via the generic authentication architecture in his home network. The above method is applicable to the case that the visited network which the user gets access to neither supports the generic authentication architecture, nor the generic authentication architecture proxy, and the application server in the visited network does not verify the B-TID, instead, it just takes it as a user identity and transfers it to the AAA server in the local network and requests the AAA server to authenticate the user.

In the above two embodiments, it is the BSF or the generic authentication architecture proxy in the local network, or the AAA server in the local network that the BM-SC sends the message of inquiring the user information to, generalized, it is not difficult for those in the field to know that the BM-SC also can send the query message of inquire the user information to other authentication entities in the network, the authentication entity is not confined herein.

Figure 4:
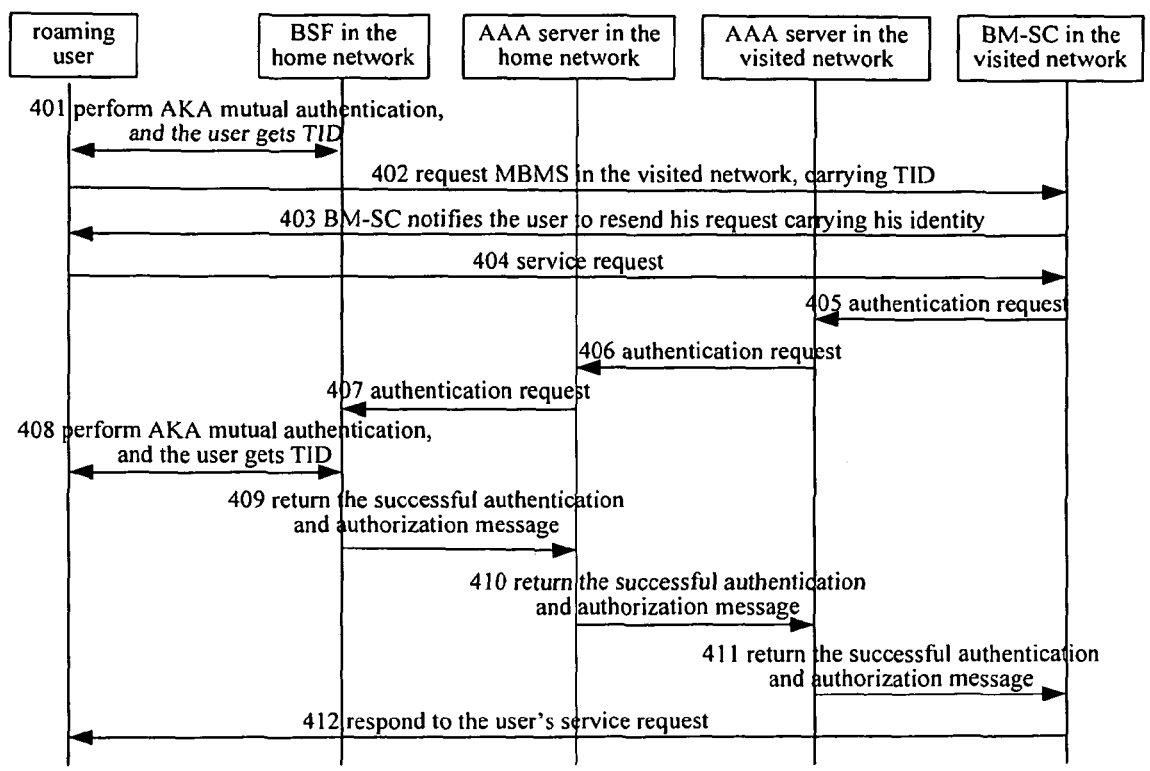
FIG. 4 is a flowchart of a third embodiment of the present invention.

FIG. 4 is the flowchart of the third embodiment of the present invention. The application server obtains the authentication results by performing authentication process with the generic authentication architecture of the roaming user's home network, and establishes security association with the roaming user according to the authentication results in the following steps:

Step 401: The roaming user carries out AKA mutual authentication with the BSF in the generic authentication architecture of his home network. After having passed the authentication, he gets the B-TID assigned by the BSF and has the shared Ks with the BSF in his home network;

Step 402: The roaming user sends service request message to the BM-SC in the visited network, with the B-TID information carried in the message;

Step 403: Since the BM-SC is unable to recognize the B-TID, the BM-SC notifies the roaming user that the identity is illegal, and indicates the user to use permanent identity, such as IMSI;

Step 404: The roaming user sends a service request message to the BM-SC, with permanent identity carried in it;

Step 405: The BM-SC in the visited network sends an authentication request to the AAA server in the local network;

Step 406: The AAA server in the visited network finds out the roaming user's home network according to the user identity, then sends an authentication request to the AAA server in the roaming user's home network;

Step 407: The AAA server in the home network requests the BSF in the generic authentication architecture of the local network to carry out authentication, for which the reason is: although the AAA server itself has authentication and charging functions and is equivalent to the BSF on status, in practical applications, different AAA servers are apt to encounter failures in their authentication of the users due to SQN being out of synchronization; the causes of the failures have been explained in many published articles. Therefore, user authentication by the generic authentication architecture for the generic authentication architecture supported services is adopted to ensure success rate of the authentication;

Step 408: The BSF in the home network completes AKA authentication process with the user. Logically, the message in the authentication process is transferred by the BM-SC in the visited network, the AAA server in the visited network, and the AAA server in the home network;

Step 409: After successful authentication, the BSF in the home network returns a successful authentication message to the BM-SC in the visited network, with successful authentication and authorization information carried in the message; Since the BSF in the home network knows which application server the authentication request is from, the BSF in the home network directly includes the roaming user's user information into the successful authentication message, and if the BSF in the home network assigns a B-TID to the user simultaneously with authentication, then the B-TID can also be included in the successful authentication message to notify the BM-SC server;

Step 410: The AAA server in the home network transfers the successful authentication message to the AAA server in the visited network, with the successful authentication and authorization information and the roaming user's information carried in the message, The user information includes key information, user identity and the profile information associated with security, of which the key information and the user identity are mandatory. The key information serves to ensure that normal communication between the user and the BM-SC, and the user identity is used for charging. If the visited network can not make sure the real identity of the user, problems will occur when the visited network settles account with the home network. The profile information associated with security is optional;

Step 411: The AAA server in the visited network transfers the successful authentication message to the BM-SC. The BM-SC obtains the roaming user's information from the received message, and simultaneously has the shared Ks or Ks-derived key with the user. Serving as the MUK of MBMS, the key functions to protect the point-to-point encrypted transmission of MSK; i.e., if only the BM-SC obtained the roaming user's user information, it establishes security association with the roaming user;

If the successful authentication message includes a B-TID, although the BM-SC is unable to identify the B-TID, the B-TID still can be used as a temporary identity in the successive communication, which is identical to the existing method of applying the temporary identity.

Step 412: Having received the successful authentication message, The BM-SC sends a confirmation message to the user, and carries out associated service process with the user including MBMS internal key distribution and service delivery. As to which kind of user identity will be used in the subsequent communication between the BM-SC and the user, it is determined according to the visited network operator's policy.

Up to now, the roaming user achieves the object of using the services in the visited network via the generic authentication architecture in his home network. The above method is applicable to the case that the visited network which the user gets access to neither supports the generic authentication architecture, nor the generic authentication architecture proxy, and the application server in the visited network verifies the identity carried in the user's request message. However, since there is no concept of the generic authentication architecture in the visited network, the application server is unable to recognize the B-TID, thus the application server demands the user to use his permanent identity.

The above description is just preferable embodiments of the present invention and should not be used to confine the protection scope thereof. Any change, equivalent substitution and improvement made without departing from the sprit and principle of this invention should be covered by the protection scope of this invention as defined by the appended claims.

The invention claimed is:

1. A method for an application server in a visited network to establish a security association with a user comprising the steps of:

receiving, by the application server in the visited network, a service request message from the roaming user, said service request message containing a Bootstrapping—Transaction Identifier (B-TID), the B-TID being assigned to the roaming user by a Bootstrapping Server Function (BSF) based upon a mutual authentication of the roaming user with the BSF that performs user identity initial verification in a generic authentication architecture in a home network of the roaming user;

returning, by the proxy in the visited inquiring, by the application server in the visited network inquiring from a proxy an in the visited network about user's user information of the user associated with the B-TID, the user information comprising user authentication results of the generic authentication architecture in the home network of the user;

identifying, by the proxy in the visited network, the home network to which the user belongs according to the B-TID;

acquiring, by the proxy in the visited network, the user information associated with the B-TID from the BSF in the home network of the user;

network, the acquired user information to the application server;

obtaining, by the application server in the visited network the user information of the user comprising the user authentication results of the generic authentication architecture in the home network of the user; and establishing, by the application server in the visited network, a security association with the user according to the user authentication results of the generic authentication architecture in the home network of the user.

2. The method according to claim 1, wherein the proxy in the visited network acquiring the user information associated with the B-TID from the home network of the user comprises:

sending, by the proxy in the visited network, a query message to the BSF in the home network of the user to inquire about the user information associated with the B-TID; and obtaining, by the proxy in the visited network, the user information associated with the B-TID from the response message returned by the BSF in the home network of the user.

3. The method according to claim 2, wherein the proxy in the visited network is an independent server, or a server combined with an authentication, authorization and accounting (AAA) server in the visited network, or a server combined with the application server in the visited network.

4. The method according to claim 1, wherein the user information comprises at least: key information and an identity of the user.

5. The method according to claim 4, wherein the user information further comprises profile information associated with security.

6. The method according to claim 4, wherein the key information is a shared key (Ks) generated in the mutual authentication, or a derived key of the Ks and a valid term of the derived key.

7. An application server, comprising:

circuitry configured to receive a service request message containing a Bootstrapping-Transaction Identifier (B-TID) from a user, the B-TID being assigned to the user by a Bootstrapping Server Function (BSF) based upon a mutual authentication of the user with the BSF that performs user identity initial verification in a generic authentication architecture in a home network of the user;

circuitry configured to inquire from a proxy in a visited network to obtain user information of the user associated with the B-TID; the user information of the user comprising user authentication results of the generic authentication architecture in the home network of the user, wherein as a result of the inquiry, the proxy identifies the home network to which the user belongs according to the B-TID, acquires the user information associated with the B-TID from the BSF in the home network of the user, and returns the acquired user information to the application server;

circuitry configured to obtain the user information of the user from the proxy in the visited network; and circuitry configured to establish a security association with the user according to the user authentication results of the generic authentication architecture in the home network of the user.

8. The application server according to claim 7, wherein the user information comprises at least: key information and an identity of the user.

9. A communication system, comprising:

an application server in a visited network, the application server configured to: receive a service request message containing a Bootstrapping-Transaction Identifier (B-TID) from a user, the B-TID being assigned to the user by a Bootstrapping Server Function (BSF) based upon a mutual authentication of the user with the BSF that performs user identity initial verification in a generic authentication architecture in a home network of the user; inquire from a proxy in the visited network about user information of the user associated with the B-TID, the user information comprising user authentication results of the generic authentication architecture in the home network of the user; obtain the user information of the user from the proxy in the visited network and establish a security association with the user according to the user authentication results of the generic authentication architecture in the home network of the user; and the proxy configured to: identify the home network to which the user belongs according to the B-TID; acquire the user information associated with the B-TID from the BSF in the home network of the user; and return the acquired user information to the application server.

* * * * *